M. Gardner, Sr.
Mandrel.

Nº 77,369. Patented Apr. 28, 1868.

Witnesses:
Jno. D. Patten
Thos. Jewell

Inventor:
Martin Gardner Sr
By atty A. B. Stoughton

United States Patent Office.

MARTIN GARDNER, SR., OF CARLISLE, PENNSYLVANIA.

Letters Patent No. 77,369, dated April 28, 1868.

IMPROVEMENT IN EXPANDING-MANDRELS.

*The Schedule referred to in these Letters Patent and making part of the same.*

TO ALL WHOM IT MAY CONCERN:

Be it known that I, MARTIN GARDNER, Sr., of Carlisle, in the county of Cumberland, and State of Pennsylvania, have invented certain new and useful Improvements in Expanding or Adjustable Mandrels; and I do hereby declare the following to be a full, clear, and exact description of the same, reference being had to the accompanying drawings, making a part of this specification, in which—

Similar letters of reference, where they occur in the separate figures, denote like parts in all the drawings.

My invention consists in an arrangement, by which the radial "gibs" of an expanding or adjustable mandrel may be moved out or in, to enlarge or diminish its diameter, by a screw-shaft and inclined planes, operated from the exterior of the mandrel.

To enable those skilled in the art to make and use my invention, I will proceed to describe the same with reference to the drawings.

Figure 1:
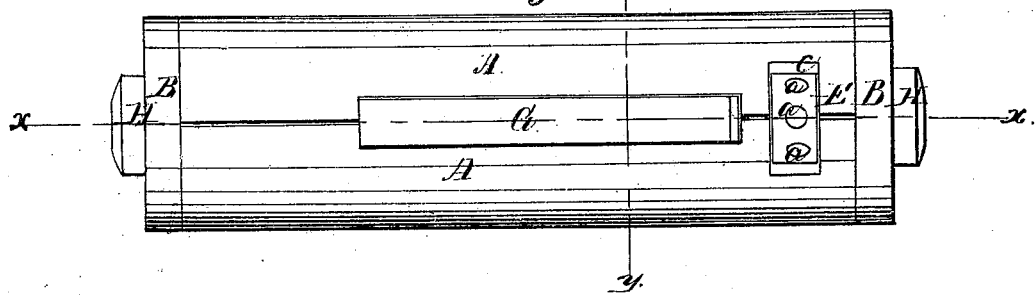
Figure 1 represents an external view of the mandrel.
Figure 2:
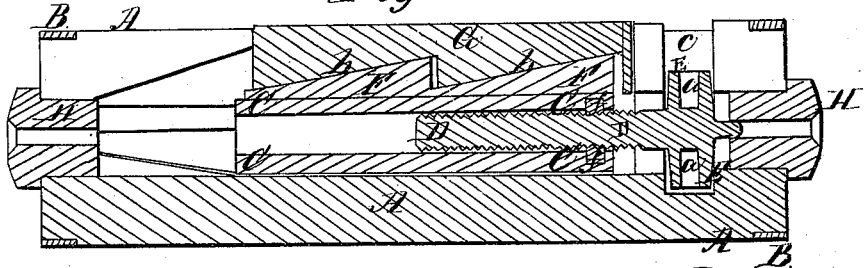
Figure 2 represents a longitudinal section through the same, at the red line $x\,x$ of fig. 1.
Figure 3:
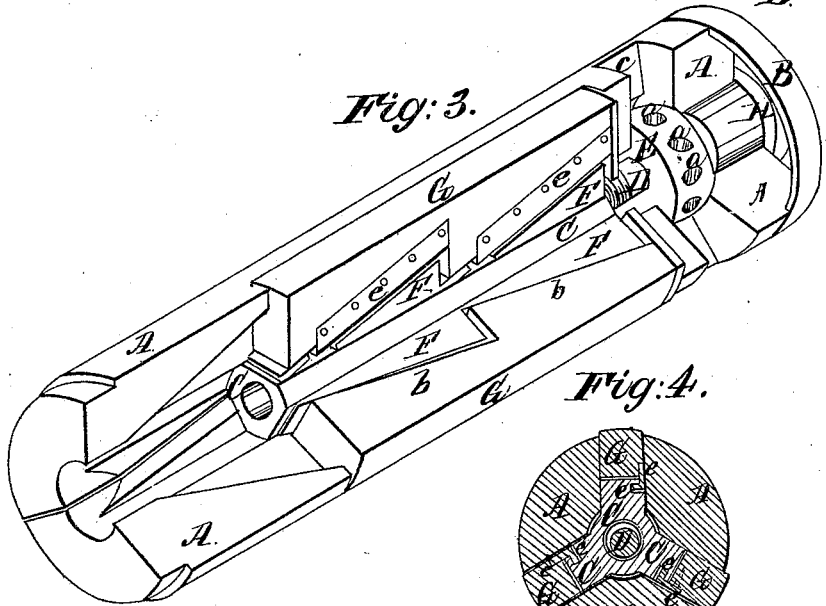
Figure 3 represents a perspective view of the mandrel, with one of its sections removed to show the interior.
Figure 4:
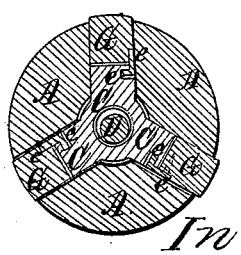
Figure 4 represents a transverse section through the mandrel, at the red line $y\,y$ of fig. 1.

A represents a mandrel, which, for the convenience of fitting up the interior, is made in sections, and the sections held together by bands B B, shrunk, screwed, or otherwise firmly put on to the ends thereof. Within the mandrel, there is a long nut, C, or screw-cylinder, which can be moved to and fro through the mandrel in a lengthwise direction, by means of a male screw, D, the head of which is in the form of a collar, E, and moves in a groove, to which radial openings, $e$, from the outside are made, so that said screw may be turned by passing a pin, from the exterior of the mandrel, through one of said radial openings into one of the holes $a$ of the head or collar E. The turning of the screw D traverses the long nut C, it not being permitted, from its form, as shown in fig. 4, to turn around its short axis. Upon the three sides of the long nut or cylinder are arranged, in radial form, the wedges or inclined planes F F.

I have shown three series of planes or wedges, and find this number to serve a good purpose, but do not confine myself to that precise number.

Through the shell of the mandrel are cut three radial mortises, through or in which work three "gibs" G, the inner portions of which have inclined planes, $b\,b$, upon them, which lie upon or against the inclined planes F, on the screw-cylinder C, and on the "gibs" are fastened inclined angle-irons, $e$, the flanges of which, as seen in fig. 4, take into similarly-inclined grooves formed in the planes F, on the screw-cylinder, so that whilst the screw-cylinder may move longitudinally in the mandrel, and the "gibs" be moved radially, yet the "gibs" are held by the angle-irons to the screw-cylinder, and prevented from dropping out of the mandrel.

Inside of the screw-cylinder, or near one of its ends, there is a nut, $f$, in which the screw D works to move said cylinder.

H H are heads, for receiving the centring-pins of a lathe, and the mandrel may be passed through any hollow thing to be turned, and the "gibs" run out to chuck the thing to be turned to the mandrel.

In turning off pulleys, boxes, wheels, washers, and similar articles, this adjustable mandrel may be used with great advantage, as it can be made to chuck articles of different diameters of openings through them.

Having thus fully described my invention, what I claim, is—

In combination with the mandrel for chucking wheels, pulleys, washers, and other articles, the arrangement of the radial "gibs" and their inclined planes, the longitudinally-moving screw-cylinder and its inclined planes, and the screw D, all constructed and arranged as described.

MARTIN GARDNER, Sr.

Witnesses:
JOSEPH FREELAND,
JOHN MARTIN.